(12) United States Patent
Jones

(10) Patent No.: US 11,808,159 B2
(45) Date of Patent: Nov. 7, 2023

(54) PROTECTION SYSTEM FOR GAS TURBINE ENGINE IN ICE CRYSTAL CONDITIONS

(71) Applicant: ROLLS-ROYCE plc, London (GB)

(72) Inventor: Geoffrey B Jones, Burton-upon-Trent (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/045,864

(22) Filed: Oct. 12, 2022

(65) Prior Publication Data

US 2023/0134256 A1 May 4, 2023

(30) Foreign Application Priority Data

Oct. 29, 2021 (GB) ...................................... 2115579

(51) Int. Cl.
| | | |
|---|---|---|
| *F01D 25/02* | (2006.01) | |
| *F01D 25/10* | (2006.01) | |
| *F01D 9/04* | (2006.01) | |
| *F02C 7/00* | (2006.01) | |

(52) U.S. Cl.
CPC ............... *F01D 25/10* (2013.01); *F01D 9/04* (2013.01); *F02C 7/00* (2013.01); *F05D 2220/323* (2013.01); *F05D 2240/12* (2013.01); *F05D 2260/20* (2013.01)

(58) Field of Classification Search
CPC .......... F01D 25/02; F01D 5/141; F01D 5/142; F01D 5/147; F04D 29/321; F04D 29/324; F04D 19/02; F02C 7/36; B64D 15/00; B64D 15/12

See application file for complete search history.

(56) References Cited

U.S. PATENT DOCUMENTS

| | | | | |
|---|---|---|---|---|
| 10,612,471 | B1* | 4/2020 | Bousfield | ................... F02C 7/36 |
| 2017/0298760 | A1* | 10/2017 | Vallino | ..................... F01D 25/10 |
| 2021/0254501 | A1* | 8/2021 | Bousfield | ................ F01D 5/147 |

FOREIGN PATENT DOCUMENTS

| | | |
|---|---|---|
| EP | 3667032 A1 | 6/2020 |
| EP | 3667095 A1 | 6/2020 |
| EP | 3702625 A1 | 9/2020 |

OTHER PUBLICATIONS

European search report dated Mar. 15, 2023, issued in EP Patent Application No. 22198603.7.
Great Britain search report dated Mar. 28, 2022, issued in GB Patent Application No. 2115579.1.

* cited by examiner

*Primary Examiner* — David E Sosnowski
*Assistant Examiner* — Maxime M Adjagbe

(57) ABSTRACT

A gas turbine engine comprises a fan; an engine core comprising a compressor, a combustor, and a turbine coupled to the compressor through a shaft; a reduction gearbox; an Engine Section Stator (ESS) comprising a plurality of ESS vanes with an external surface washed by the core airflow; an ESS heating system adapted to heat the ESS vanes, and a temperature sensor adapted to detect the temperature of the external surface of the ESS vanes and send a signal to the ESS heating system when said temperature is below a reference temperature. Upon detection and/or inference of ice crystal conditions and receiving from the temperature sensor the signal that the temperature is below the reference temperature, the ESS heating system is activated to heat at least a portion of the external surface of the ESS vanes and promote melting and adhering of ice crystals thereto.

20 Claims, 4 Drawing Sheets

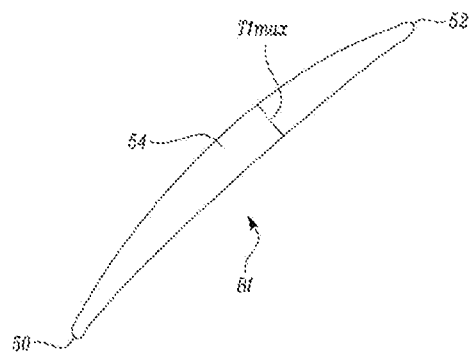
Fig. 8a
Fig. 8b
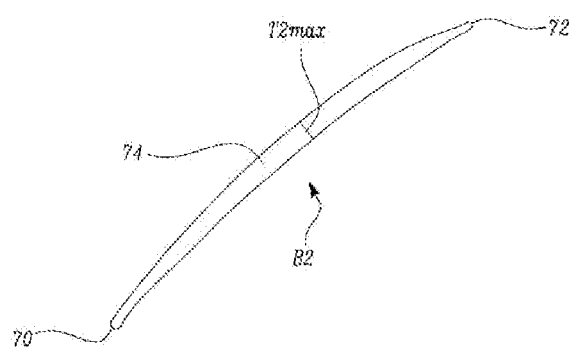
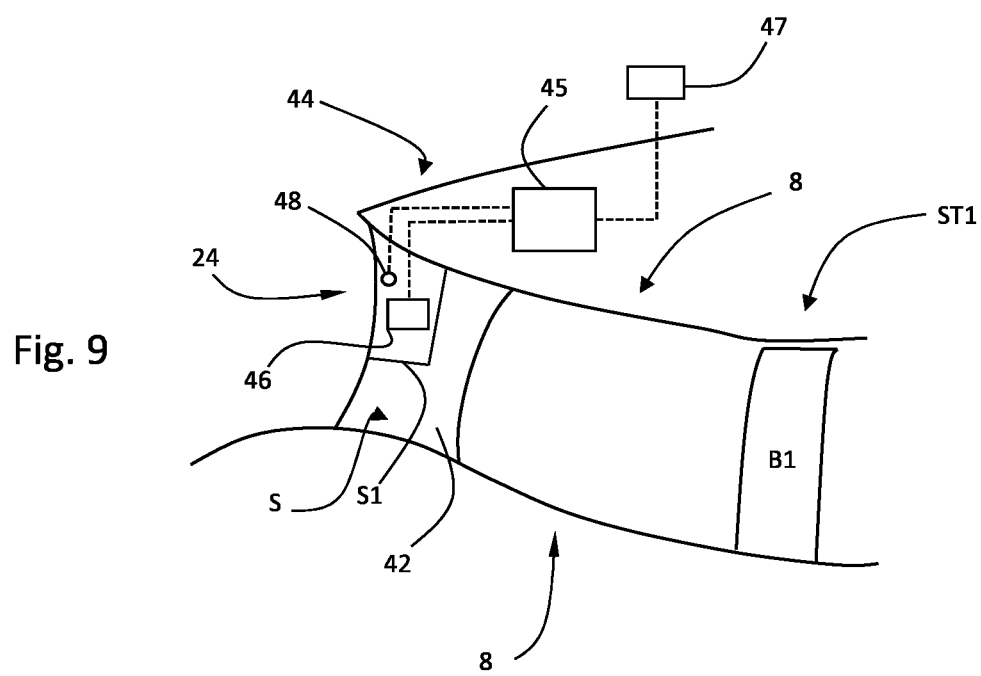
Fig. 9

PROTECTION SYSTEM FOR GAS TURBINE ENGINE IN ICE CRYSTAL CONDITIONS

CROSS-REFERENCE TO RELATED APPLICATIONS

This specification is based upon and claims the benefit of priority from UK Patent Application Number 2115579.1 filed on Oct. 29, 2021, the entire contents of which are incorporated herein by reference.

BACKGROUND

Technical Field

The present disclosure relates generally to gas turbine engines, and more specifically to arrangements for a protection system and method for a gas turbine engine in ice crystal conditions.

Description of the Related Art

Gas turbine engines are used to power aircraft, watercraft, power generators, and the like. A gas turbine engine generally comprises, in axial flow series from front to aft, an air intake, a fan, one or more compressors, a combustor, one or more turbines, and an exhaust nozzle. Air entering the air intake is accelerated by the fan to produce two air flows: a first air flow (core engine flow) through an engine core duct into compressor and a second air flow (bypass flow) which passes through a bypass duct to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

The compressor may be a multi-stage compressor, wherein each compressor stage comprises in axial flow series a row of rotor blades and a row of stator vanes. A radially inner end of the rotor blades are connected to a hub that define an inner annulus. A casing circumscribes the rotor blades and the stator vanes and defines an outer annulus. The rotor blades and the stator vanes each have a root and an aerofoil portion with a tip, a trailing edge and a leading edge.

Gas turbine engines generally operate in icing forming conditions. Ice can accrete on parts of the engine, altering the airflow, reducing lift, increasing drag and adding weight, therefore negatively affecting engine performance and safety. Icing is generally caused by either supercooled water, or ice crystals present in the atmosphere, or both. Supercooled water and ice crystals behave differently as they come into contact with different parts of the gas turbine engine. Supercooled water instantly freezes as soon as it comes into contact with any relatively cold (typically below 0° C.) part of the engine, whereas ice crystals can bounce off from relatively cold surfaces and melt onto relatively hot surfaces. As a consequence of supercooled water, ice generally accretes on the fan, or ahead of the fan, and is shed radially outward either into the bypass duct or into the engine core duct. Conversely, ice crystals can travel through the fan, and if not diverted in the bypass duct, can stick to, and accrete on, compressor stator vanes downstream in the engine core duct adversely affecting engine performance and operability. Ice crystals, which can be as small as 40 μm (microns) in diameter, can partially melt and create a film of moisture on relatively warm surfaces of the compressor stator vanes. The moisture traps additional ice crystals, and eventually, the ice buildup is shed into the compressor causing the engine to surge and stall, and possibly reaching the combustor, causing a flameout. Additionally, ice shed can damage compressor rotor blades and stator vanes. To prevent the blades and vanes being damaged, it has been proposed to increase the thickness of the blades and vanes of all stages, but this would negatively affect the engine efficiency.

Ice crystals can be particularly problematic in large, geared gas turbine engines (compared to relatively small and/or non-geared engines) owing to the low speed and low hub stagger of the fan, so reducing the likelihood to direct such ice crystals towards the bypass duct. In other words, in geared engines the severity and size of the ice accretion in the engine core duct can be significantly higher than in small and/or not geared engines.

A typical approach against icing is that of preventing the bonding of snow and ice to the component surfaces by means of anti-icing procedures and systems, and if and once snow or ice has formed, de-icing procedures are conducted to remove it.

Different anti-icing systems have been proposed to protect the engine against ice bonding and accretion, but they all have the disadvantage that they require additional hardware, which adds weight and complexity to the engine, and are detrimental to the overall performance of the engine and reduce its efficiency.

There is therefore still a need for an improved system for icing protection, in particular in ice crystal conditions, for a gas turbine engine.

SUMMARY

According to a first aspect, there is provided a gas turbine engine comprising a fan mounted to rotate about a main longitudinal axis and generating a core airflow and a bypass airflow; a core duct, across which the core airflow flows; an engine core, comprising in axial flow series a compressor, a combustor, and a turbine coupled to the compressor through a shaft; an Engine Section Stator (ESS) comprising a plurality of ESS vanes arranged in the core duct downstream of the fan, each one of the plurality of ESS vanes comprising an external surface washed by the core airflow; an ESS heating system adapted to heat the ESS vanes; and a reduction gearbox that receives an input from the shaft and drives the fan at a lower rotational speed than the shaft, wherein the compressor comprises a first stage at an inlet comprising a first rotor with a row of first blades extending chordwise from a leading edge to a trailing edge, and spanwise from a root to a tip for a span height (H), wherein 0% of the span height (H) corresponds to the root and 100% of the span height (H) corresponds to the tip; and wherein the ratio of a maximum leading edge radius of the first blades to a leading edge radius of the first blades at 50% span height (H) is comprised between 1.0 and 2.2. According to the first aspect, the gas turbine engine further comprises a temperature sensor adapted to detect the temperature of the external surface of at least one of the plurality of ESS vanes and send a signal to the ESS heating system when said temperature is below a reference temperature, and wherein upon detection and/or inference of ice crystal conditions and receiving from the temperature sensor the signal that the temperature is below the reference temperature, the ESS heating system is activated to heat at least a portion of the external surface of the ESS vanes and promote melting and adhering of ice crystals on said portion of the external surface of the ESS vanes.

In the present disclosure, upstream and downstream are with respect to the air flow through the compressor; and front and rear is with respect to the gas turbine engine, i.e. the fan being in the front and the turbine being in the rear of the engine.

The present disclosure provides an alternative solution to how to deal with icing in ice crystal conditions, based on promoting, rather than preventing and avoiding, adherence of ice crystals on the ESS vanes and increasing the thickness of the first rotor blades at specific span heights only, with a limited effect on efficiency, rather than increasing the thickness of the blades of all rotors, which would be particularly detrimental to efficiency.

In other words, the present disclosure provides for a solution with higher overall efficiency, less susceptible to damage, and that does not require complex and/or heavy systems to reduce ice accretion.

The present inventors have realised and understood that in ice crystal conditions, in contrast to the prior art, it is advantageous to promote melting and therefore buildup of ice crystals on a specific, robust part of the engine, i.e. on the ESS vanes, rather than preventing ice buildup on other more vulnerable and weaker components/parts of the compressor through costly and efficiency-detrimental anti-icing and de-icing procedures and systems, and then have the blades of the first rotor of the compressor relatively robust to shield the downstream stages of the compressor. To this purpose the first blades feature a relatively large maximum leading edge radius with respect to the leading edge radius at 50% span height. In this regard it has to be noticed that the maximum leading edge radius is a measure of the blade capability to withstand ice impacts: the greater the maximum leading edge radius, the better the blade capability to withstand ice impacts.

When shed from the ESS vanes, ice is intercept by the first blades of the first rotor of the compressor protecting the downstream stages. The advantage of having the first rotor acting as a shield is that the downstream stages (both rotor blades and stator vanes) may be designed to optimise aerodynamic efficiency, without compromises and/or penalties due to ice crystal protection. In other words, the downstream stages, in particular the blades of the second rotor, may not need to be made relatively robust and therefore thicker and heavier to resist ice impacts, because ice crystals entering the engine core duct may be effectively dealt with by the ESS vanes and the first rotor.

Another advantage of the present disclosure is that de-icing procedures and systems, like electrical heaters, heat exchangers, or conduits to direct hot air towards the compressor blades and vanes may not be necessary and may be omitted. Similarly, de-icing procedures and systems for the ESS vanes may not be necessary and may be omitted, as ice built up on the ESS vanes may detach and shed therefrom owing to aerodynamic loading or vibration only.

According to the disclosure, the ESS heating system is operated to heat at least a portion of the external surface of the ESS vanes, so that ice crystals contacting that portion melt and create a film of moisture on to which other ice crystals would adhere. The ESS heating system may be operated to provide no more than the heat required to create the film of moisture. In other words, compared with the anti-icing systems known in the art, which are designed to provide the heat necessary to prevent ice adhering and building up on the ESS vanes, less energy is required.

According to the disclosure, the ratio of the maximum leading edge radius of the first blades to the leading edge radius of the first blades at 50% span height may be comprised between 1.0 and 2.1, or between 1.0 and 2.0, or between 1.0 and 1.9, or between 1.0 and 1.8, or between 1.2 and 2.2, or between 1.2 and 2.1, or between 1.2 and 2.0, or between 1.2 and 1.9, or between 1.2 and 1.8, or between 1.4 and 2.2, or between 1.4 and 2.1, or between 1.4 and 2.1, or between 1.4 and 2.0, or between 1.4 and 1.9, or between 1.4 and 1.8.

The maximum leading edge radius of the first blade may be located at between 70% and 100% of the span height, preferably between 80% and 100%, where 0% corresponds to the root and 100% corresponds to the tip.

The maximum leading edge radius of the first blades may be greater than 0.4 mm, for example greater than 0.45 mm, or greater than 0.5 mm, or greater than 0.55 mm, or greater than 0.6 mm.

The maximum leading edge radius of the first blades may be less than 0.9 mm, for example less than 0.85 mm, or less than 0.80 mm, or less than 0.75 mm, or less than 0.70 mm.

The ratio of the maximum leading edge radius of the first blades to the maximum leading edge radius of the second blades may be less than 10. For example, the ratio of the maximum leading edge radius of the first blades to the maximum leading edge radius of the second blades may be less than 9, or less than 8.

The maximum leading edge radius of the second blades may be comprised between 0.1 and 0.3 mm. For example, the maximum leading edge radius of the second blades may be comprised between 0.1 and 0.25 mm, or between 0.1 and 0.20 mm, or between 0.15 and 0.30 mm, or between 0.15 and 0.25 mm, or between 0.15 mm and 0.20 mm.

The ratio of the maximum leading edge radius of the first blades to a minimum leading edge radius of the first blades may greater than 2.2. For example, the ratio of the maximum leading edge radius of the first blades to the minimum leading edge radius of the first blades may greater than 2.5, or greater than 3, or greater than 3.5, or greater than 4.

The ratio of the maximum leading edge radius of the first blades to the minimum leading edge radius of the first blades may be less than 7, for example less than 6, or less than 5.5, or less than 5. The ratio of the maximum leading edge radius of the first blades to the minimum leading edge radius of the first blades may be comprised between 2.2 and 7, for example between 2.5 and 5, or between 2.5 and 4.

The minimum leading edge radius of the first blade may be located at less than 50% of the span height, for example less than 40%, or less than 30%, or between 15% and 50%, or between 15% and 40%, or between 20% and 30%, of the span height.

The minimum leading edge radius of the first blades may be greater than 0.15 mm, for example greater than 0.20 mm, or greater than 0.21 mm, or greater than 0.22 mm, or greater than 0.23 mm, or greater than 0.24 mm.

The minimum leading edge radius of the first blades may be less than 0.6 mm, for example less than 0.55 mm, or less than 0.5, or less than 0.4 mm, or less than 0.35 mm, or less than 0.30 mm.

The ratio of a tip maximum thickness of the second blades to a tip maximum thickness of the first blades may be less than 0.45. For example, the ratio of the tip maximum thickness of the second blades to the tip maximum thickness of the first blades may be less than 0.40, or less than 0.35, or less than 0.3, or less than 0.25, or less than 0.2, or less than 0.15. For example, the ratio of the tip maximum thickness of the second blades to a tip maximum thickness of the first blades may be comprised between 0.45 and 0.10, or between 0.45 and 0.15, or between 0.45 and 0.20, or between 0.40 and 0.15, or between 0.40 and 0.20.

As the tip is the area of the blades where ice impact is generally more dangerous to blade integrity, by increasing the tip maximum thickness of the first blades only, the first blades may be made more robust against ice and may protect the second blades, which in turn may be designed with a tip maximum thickness to optimise aerodynamic performance and not ice impact protection.

The tip maximum thickness of the first blades may greater than 2.7 mm, for example greater than 3.0 mm, or greater than 3.5 mm, or greater than 4.0 mm.

The tip maximum thickness of the first blades may be less than 5 mm, for example less than 4.5 mm, or less than 4.0 mm.

The tip maximum thickness of the second blades may be between 1.2 mm and 2.25 mm.

The ratio of the tip maximum thickness of the first blades to the maximum leading edge radius of the first blades may be less than 6.5.

The ratio of the tip maximum thickness of the first blades to the maximum leading edge radius of the first blades may be greater than 2, for example greater than 2.5, or greater than 3, or greater than 3.5, or greater than 4.

The ESS heating system may comprise any one, or a combination, of electrical heaters, heat exchangers, or passageways for relatively hot fluids in the interior of the ESS vanes.

For example, the ESS vanes may be heated by passing conduits bearing hot fluids there-through, for example bleed air from the compressor.

A further advantage of the present disclosure is that a reduced amount of heat is required compared to known anti-icing and de-icing systems, as only the heat to create a film of moisture on the external surface of the ESS vanes is required. To this purpose, the ESS heating system is configured to provide at least a portion of the external surface of each ESS vane with heat. In embodiments, the at least a portion of the external surface of each ESS vane which is provided with heat may be less than 75% of the external surface. The at least a portion of the external surface of each ESS vane which is provided with heat may be less than 70%, for example less than 65%, or less than 60%, or less than 55%, or less than 50% of the external surface. The at least a portion of the external surface of each ESS vane which is provided with heat may be greater than 5%, for example greater than 10%, or greater than 15%, or greater than 20%, or greater than 25% of the external surface.

The portion of the external surface may be a front portion of the external surface of the ESS vanes.

Upon activation, the ESS heating system may be configured to provide the at least a portion of the external surface of each ESS vanes with an amount of heat less than 5 W/m$^2$, for example less than 4.5 W/m$^2$, or less than 4.0 W/m$^2$, or less than 3.5 W/m$^2$, or less than 3.0 W/m$^2$.

Upon activation, the ESS heating system may be configured to provide the at least a portion of the external surface of each ESS vanes with heat in an amount greater than 0.2 W/m$^2$, for example greater than 0.5 W/m$^2$, or greater than 1.0 W/m$^2$, or greater than 1.5 W/m$^2$, or greater than 2.0 W/m$^2$.

The ESS heating system may be connected to one or more temperature sensors adapted to detect the temperature of the external surface of the ESS vanes and provide the ESS heating system with a signal representative of the temperature being detected. The ESS heating system may then be activated in response to that signal, for example to maintain the temperature above a minimum value of 0° C., or above a minimum value of 5° C. The ESS heating system may be activated to maintain the temperature below a maximum value of 40° C., or below a maximum value of 35° C., or below a maximum value of 30° C. According to the disclosure, ice crystal condition may be detected and/or inferred, and upon detection and/or inference of ice crystal conditions, the ESS heating system is activated.

Any known device, system or method may be used to detect and/or infer ice crystal conditions. For example, on-board weather radars and/or optical detectors and/or satellite radars may be used to detect ice crystal conditions and activate the ESS heating system. Alternatively, or in addition, the ESS heating system may be activated upon inference of ice crystal conditions. For example, temperature and altitude sensors may detect conditions which may form ice crystals, for example when within the ice crystal icing envelope as defined in EASA CS-25 Book 1, Appendix P, FIG. 1. In another known system, acoustic sensors may be used to detect the sound of impacts of particles on a surface of the gas engine that are then compared with one or more stored sounds of impacts, the one or more stored sounds of impacts corresponding to ice crystals hitting the surface. If the sound of the impacts of particles matches the one or more stored sounds, then an activation signal may be sent to the ESS heating system.

The compressor may comprise two or more stages. For example, the compressor may comprise three or four stages. The compressor may comprise less than twelve stages, for example less than eleven, or ten stages.

For example, the compressor may comprise 3 to 8 stages.

The compressor may be an intermediate pressure compressor and the gas turbine engine may further comprise a high pressure compressor downstream of the intermediate pressure compressor.

Where the gas turbine engine comprises more than one compressor, the compressor may be the first compressor downstream of the EES in the core duct.

The turbine may be an intermediate pressure turbine and the gas turbine engine may further comprise a high pressure turbine upstream of the intermediate pressure compressor.

The shaft may be a first shaft and the gas turbine engine may further comprise a second shaft coupling the high pressure turbine to the high pressure compressor.

According to a second aspect, there is provided a method of ice protection for a gas turbine engine comprising:
  providing a gas turbine engine comprising:
    a fan mounted to rotate about a main longitudinal axis and generating a core airflow and a bypass airflow;
    a core duct, across which the core airflow flows;
    an engine core, comprising in axial flow series a compressor, a combustor, and a turbine coupled to the compressor through a shaft;
    an Engine Section Stator (ESS) comprising a plurality of ESS vanes arranged in the core duct downstream of the fan, each one of the plurality of ESS vanes comprising an external surface washed by the core airflow;
    an ESS heating system adapted to heat the ESS vanes;
    a temperature sensor adapted to detect the temperature of the external surface of at least one of the plurality of ESS vanes and send a signal to the ESS heating system when said temperature is below a reference temperature, a reduction gearbox that receives an input from the shaft and drives the fan at a lower rotational speed than the shaft, wherein the compressor comprises a first stage at an inlet comprising a first rotor with a row of first blades extending chordwise from a leading edge to a trailing edge, and spanwise from a root to a tip for a span height (H), wherein 0% of the span height (H) corresponds to the root and 100% of the span height (H) corresponds to the tip, and wherein the ratio of a maximum leading edge radius of the first blades to a leading edge radius of the first blades at 50% span height H is comprised between 1.0 and 2.2; and upon detection and/or inference of ice crystal conditions and receiving from the temperature sensor the signal that the temperature is below the reference temperature, activating the ESS heating system to heat at least a portion of the external surface of the ESS vanes and promote melting and adhering of ice crystals on said portion of the external surface of the ESS vanes.

The portion of the external surface of each ESS vane may be greater than 5%, preferably greater than 10%, or, greater than 15%, or greater than 20%, of the external surface of the ESS vanes.

Furthermore the external surface of each ESS vane less than 75%, preferably less than 70%, or less than 65%, or less than 60% or less than 55%, or less than 50%, of the external surface of the ESS vanes.

Activating the ESS heating system may comprise heating the external surface of the ESS vanes to a temperature of at least 0° C., preferably at least 5° C., or at least 10° C., or at least 15° C. For example, activating the ESS heating system may comprise heating the portion of the external surface of the ESS vanes to a temperature of at least 0° C., preferably at least 5° C., or at least 10° C., or at least 15° C.

Furthermore activating the ESS heating system may comprise heating the external surface of the ESS vanes to a temperature of less than 40° C., preferably less than 35° C., or less than 30° C., or less than 25° C. For example activating the ESS heating system may comprise heating the portion of the external surface of the ESS vanes to a temperature of less than 40° C., preferably less than 35° C., or less than 30° C., or less than 25° C.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 230 cm (around 90.5 inches), 235 cm (around 92.5 inches), 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds), for example between 240 cm and 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the first and second aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIGS. 8a and 8b are top views of tips of a first rotor blade and a second rotor blade, respectively; and FIG. 9 schematically show an ESS heating system according to an embodiment of the disclosure.

DETAILED DESCRIPTION

Figure 1:
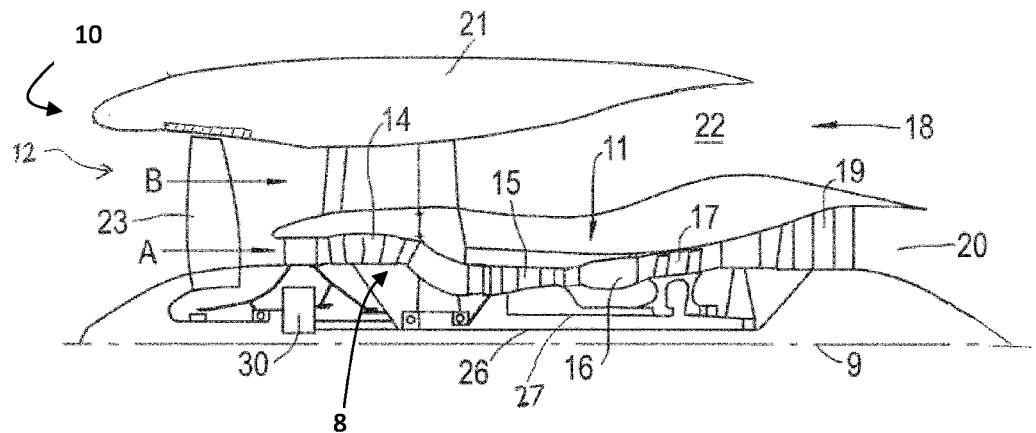
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A through an engine core duct 8 and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
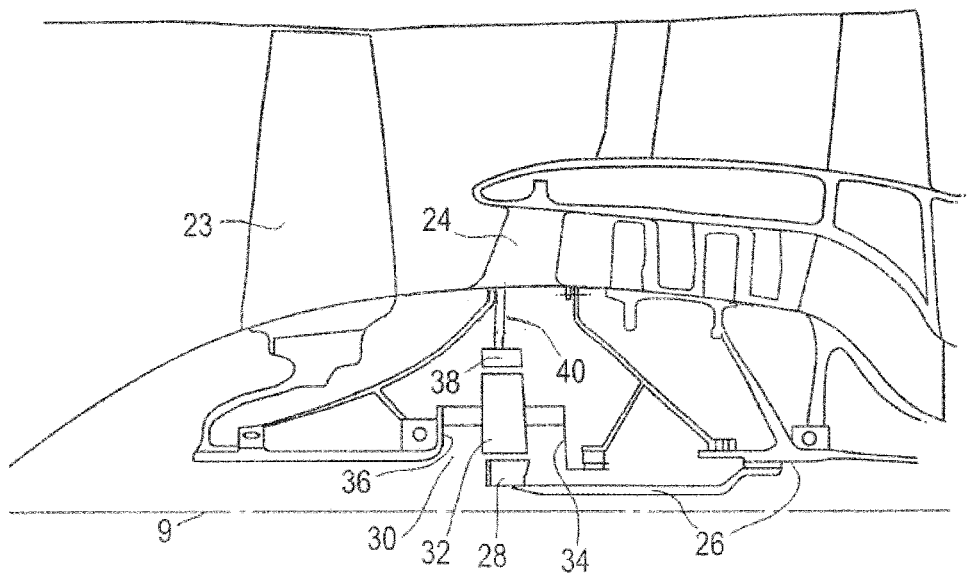
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure, such an Engine Section Stator (ESS) 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
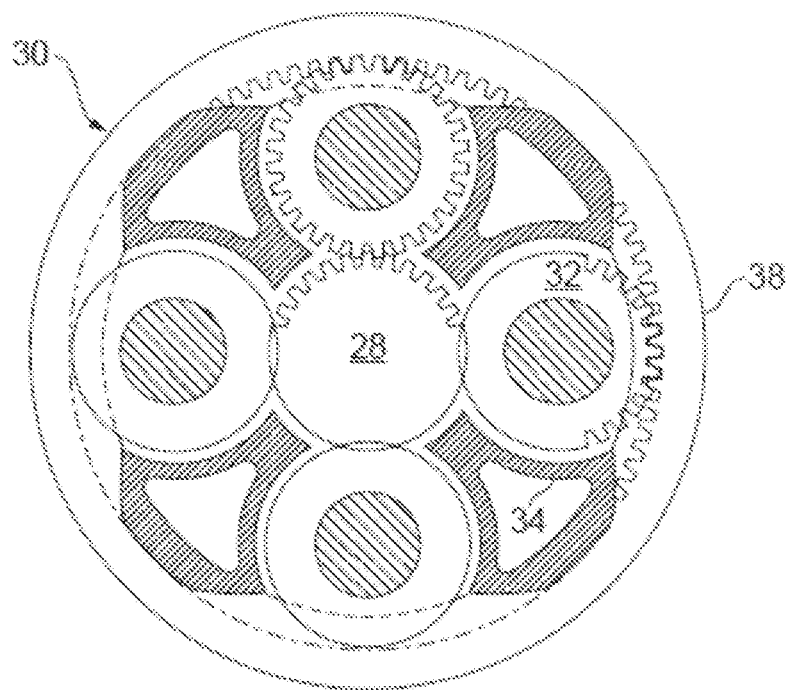
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
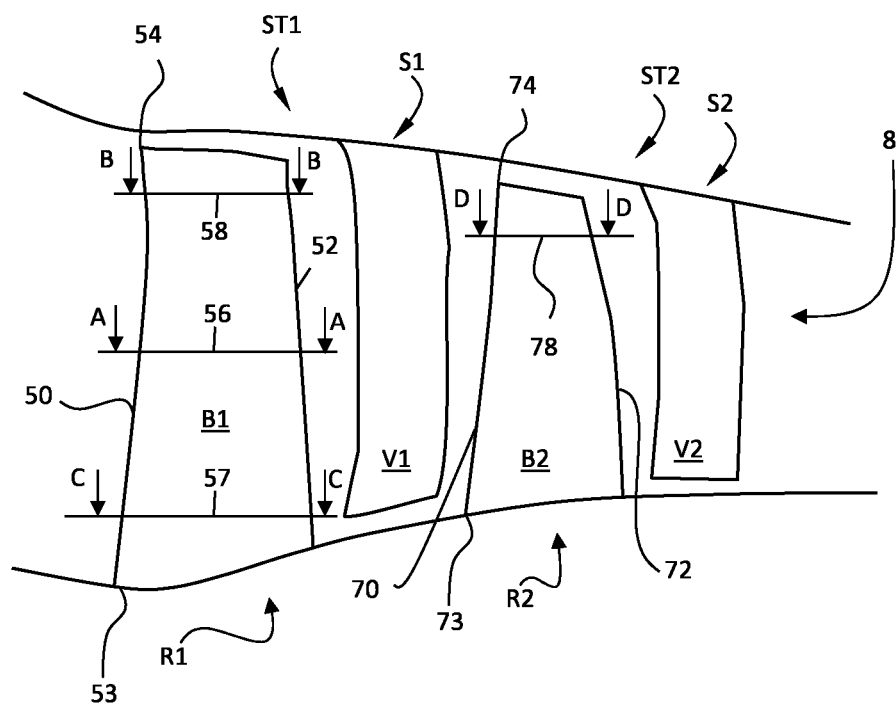
FIG. 4 is an enlarged schematic view of a part of a compressor of the gas turbine engine.

FIG. 4 illustrates a forward part of the low pressure compressor 14 in further detail.

The low pressure compressor 14 comprises a first stage ST1 with a first rotor R1 and a first stator S1, and a second stage ST2 with a second rotor R2 and a second stator S2. The low pressure compressor 14 may comprise other stages, not illustrated, downstream of the second stage ST2.

Each rotor (R1, R2) and stator (S1, S2) comprises a plurality of blades (B1, B2) and vanes (V1, V2), respectively.

In detail, the first rotor R1 and the second rotor R2 comprise a row of first blades B1 and second blades B2, respectively; whereas the first stator S1 and the second stator S2 comprise a row of first vanes V1 and second vanes V2, respectively.

The first blades B1 may have a span comprised between 140 mm and 220 mm, and a true chord comprised between 80 mm and 160 mm.

The second blades B2 may have a span comprised between 120 mm and 180 mm, and a true chord comprised between 55 mm and 85 mm.

Each blade B1, B2 and vane V1, V2 comprise an aerofoil portion with a leading edge, a trailing edge, a root, and a tip.

The first blade B1 has a leading edge 50, a trailing edge 52, a root 53, and a tip 54.

Figure 5:
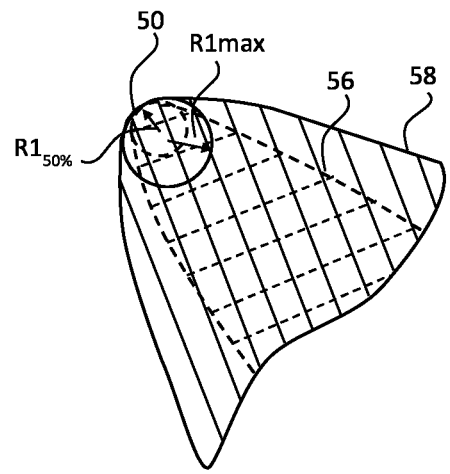
FIG. 5 is a partial schematic view, in cross-section, of a first rotor blade illustrating a difference between a maximum leading edge radius and a leading edge radius at 50% span height.

The leading edge 50 has a leading edge radius variable along the span between a minimum leading edge radius R1min and a maximum leading edge radius R1max. At 50% span, i.e. mid-way between 0% span corresponding to the root 53 and 100% span corresponding to the tip 54, the leading edge radius has a value $R1_{50\%}$. In FIG. 5, there are schematically illustrated the 50% span leading edge radius $R1_{50\%}$ (in dashed line) and the maximum leading edge radius R1max by overlapping corresponding cross-sections 56, 58 of the first blades B1 taken along lines A-A and B-B of FIG. 4, respectively, in such a way that the leading edge 50 at those sections coincide.

Figure 6:
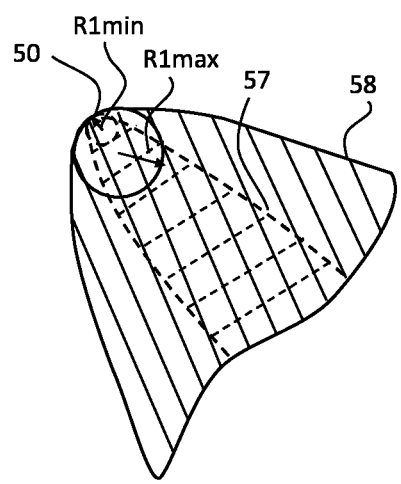
FIG. 6 is a partial schematic view, in cross-section, of the first rotor blade illustrating a difference between a maximum and a minimum leading edge radius.

In FIG. 6, there are schematically illustrated the minimum leading edge radius R1min (in dashed line) and the maximum leading edge radius R1max by overlapping corresponding cross-sections 57, 58 of the first blades B1 taken along lines C-C and B-B of FIG. 4, respectively, in such a way that the leading edge 50 at those sections coincide.

The section 58 containing the maximum leading edge radius R1max may be at a span height between 70% and 100%, for example between 80% and 100%, or 80% and 95%.

The section 57 containing the minimum leading edge radius R1min may be at a span height between 0% and 30%, for example between 10% and 30%, or 15% and 25%.

The minimum leading edge radius R1min may be greater than 0.15 mm, or greater than 0.20 mm, and less than 0.6 mm, for example equal to 0.25 mm.

The leading edge radius $R1_{50\%}$ may be greater than 0.25 mm, or greater than 0.30 mm, and less than 0.50 mm, for example equal to 0.4 mm.

The maximum leading edge radius R1max may greater than 0.4 mm, and less than 0.9 mm, for example equal to 0.7 mm.

The ratio of the maximum leading edge radius R1max of the first blades B1 to the leading edge radius $R1_{50\%}$ of the first blades at 50% span height H is comprised between 1.0 and 2.2.

The ratio of the maximum leading edge radius R1max of the first blade B1 to the minimum leading edge radius of the first blade B1 may be greater than 2.2, and less than 7, for example equal to 2.8.

The second blade B2 has a leading edge 70, a trailing edge 72, a root 73, and a tip 74. Analogously to the first blade B1, the leading edge 70 has a leading edge radius variable along the span between a minimum leading edge radius (not illustrated) and a maximum leading edge radius R2max, which is smaller than the maximum leading edge radius R1max of the first blade B1. The maximum leading edge radius R2max of the second blade B2 may be at a cross section 78, corresponding to a span height between 85% and 100%.

Figure 7:
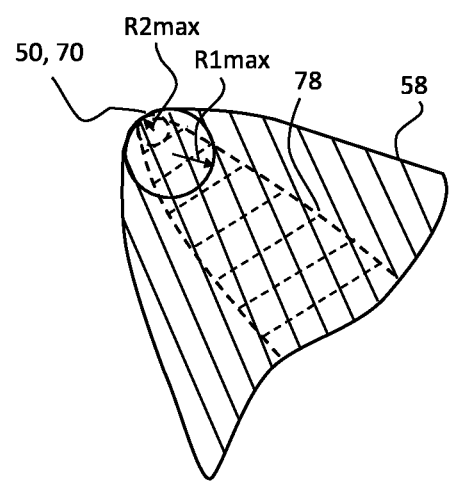
FIG. 7 is a partial schematic view, in cross-section, showing the difference between the maximum leading edge radius of a first rotor blade and a maximum leading edge radius of a second rotor blade.

In FIG. 7 there are illustrated the maximum leading edge radius R1max of the first blade B1 and the maximum leading edge radius R2max of the second blade B2 by superimposing section 58 and section 78 taken along lines B-B and D-D of FIG. 4, respectively, in such a way that the leading edge 50 of the first blade B1 and the leading edge 70 of the second blade B2 coincide. Section 78 containing the maximum leading edge radius R2max of the second blade B2 is illustrated in dashed line in FIG. 7.

The maximum leading edge radius R2max of the second blade B2 may be comprised between 0.1 mm and 0.2 mm, for example equal to 0.16 mm.

The ratio of the maximum leading edge radius R1max of the first blade B1 to the maximum leading edge radius R2max of the second blade B2 may be greater than 2.8, and less than 10, for example equal to about 4.4.

In FIGS. 8a and 8b there are illustrated top views of the tips 54, 74 of first blade B1 and the second blade B2, respectively.

The tip 54 of the first blade B1 features a maximum thickness T1max that may be greater than 2.7 mm, and less than 5 mm, for example equal to 4.3 mm. The maximum thickness T1max may be arranged at a chordwise position between 48% and 54%, for example between 50% and 52%, or about 51%, where 0% corresponds to the leading edge 50 and 100% corresponds to the trailing edge 52.

The tip 74 of the second blade B2 features a maximum thickness T2max that may be greater than 1.2 mm and less than 2.25 mm, for example equal to 1.7 mm. The maximum thickness T2max may be arranged at a chordwise position between 42% and 62%, for example between 48% and 54%, or 50% and 52%, where 0% correspond to the leading edge 70 and 100% corresponds to the trailing edge 72.

The ratio of the tip maximum thickness T2max of the second blades B2 to the tip maximum thickness T1max of the first blades B1 may be less than 0.45 and greater than 0.10, for example 0.25.

FIG. 9 schematically illustrates a portion of the engine core duct 8 and the Engine Section Stator (ESS) 24 arranged therein. The ESS 24 comprises a plurality of ESS vanes 42 circumferentially arranged about the engine main axis 9 and comprising an external surface S washed by the core airflow A.

An ESS heating system 44 is provided to heat the ESS vanes 42. The ESS heating system 44 comprises a control unit 45 and heaters 46 controlled by the control unit 45 and located within the ESS vanes 42. The heaters 46 may be electrical and electrical power may be obtained from generators (not shown) driven by the gas turbine engine itself.

Alternatively, the heaters 46 may use relatively hot hair, for example bleed air taken from the compressor and fed through pipes to the ESS vanes 42, to heat the ESS vane 42 up. In a further alternative configuration, the heaters 46 may use both electrical heaters and hot air to heat the ESS vanes 42 up.

The heaters 46 are adapted to heat at least a portion S1 of the external surface S of the ESS vanes 42. The portion S1 may be comprised between 5% and 100%, for example between 5% and 75%, of the external surface S. In one embodiment, the portion S1 comprises at least a portion of the leading edge of the ESS vanes 42, for example at least 50% of the leading edge of the ESS vanes 42. In other embodiments, the portion S1 comprises the whole leading edge of the ESS vanes 42.

At least one temperature sensor 48 is provided to detect the temperature of the external surface S, for example of the portion S1, of at least one of the ESS vanes 42 and transmit a signal representative of such temperature to the control unit 45 of the ESS heating system 44.

The ESS heating system 44, in particular the control unit 45, is also configured to receive a further signal in case ice crystal conditions are detected and/or inferred. Known devices, systems and methods may be used to detect and/or infer ice crystal conditions, such as on-board weather radars, optical detectors, satellite radars, acoustic sensors, and/or temperature and altitude sensors, all schematically illustrated with a box 47 in FIG. 9, and to send such further signal to the ESS heating system 44.

Upon receiving of the signal from the at least one temperature sensor 48 that the temperature of the external surface S, for example of the portion S1, is below the reference temperature and the further signal that ice crystal conditions are detected and/or inferred, the ESS heating system 44 heats the plurality of ESS vanes 42 to promote melting and adhering of ice crystals to the portion S1. In embodiments, the ESS heating system 44 may be activated until the temperature of the external surface S, for example of the portion S1, is comprised between 0° C. and 40° C., and/or for a fixed amount of time, and/or until ice crystal conditions are detected and/or inferred.

The reference temperature may be below 0° C.

The ESS heating system 44 provides the portion S1 of the ESS vane 42 with heat in an amount of at least 0.2 W/m², for example at least 0.5 W/m². The ESS heating system 44 provides the portion S1 of the ESS vane 42 with heat in an amount less than 5.0 W/m², for example less than 4.5 W/m². For example the ESS heating system 44 provides the portion S1 of the ESS vane 42 with heat in an amount comprised between 0.2 and 5.0 W/m².

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A gas turbine engine comprising:
   a fan mounted to rotate about a main longitudinal axis and generating a core airflow and a bypass airflow;
   a core duct, across which the core airflow flows;
   an engine core, comprising in axial flow series a compressor, a combustor, and a turbine coupled to the compressor through a shaft;
   an Engine Section Stator (ESS) comprising a plurality of ESS vanes arranged in the core duct downstream of the fan, each one of the plurality of ESS vanes comprising an external surface washed by the core airflow;
   an ESS heating system adapted to heat the ESS vanes; and
   a reduction gearbox that receives an input from the shaft and drives the fan at a lower rotational speed than the shaft,
   wherein the compressor comprises a first stage at an inlet comprising a first rotor with a row of first blades extending chordwise from a leading edge to a trailing edge, and spanwise from a root to a tip for a span height (H), wherein 0% of the span height (H) corresponds to the root and 100% of the span height (H) corresponds to the tip;
   wherein the ratio of a maximum leading edge radius of the first blades to a leading edge radius of the first blades at 50% span height (H) is comprised between 1.0 and 2.2; and
   wherein the gas turbine engine further comprises:
   a temperature sensor adapted to detect the temperature of the external surface of at least one of the plurality of ESS vanes and send a signal to the ESS heating system when said temperature is below a reference temperature, and
   wherein upon detection and/or inference of ice crystal conditions and receiving from the temperature sensor the signal that the temperature is below the reference temperature, the ESS heating system is activated to heat at least a portion of the external surface of the ESS vanes and promote melting and adhering of ice crystals on said portion of the external surface of the ESS vanes.

2. The gas turbine engine according to claim 1, wherein the ratio of the maximum leading edge radius of the first blades to the leading edge radius of the first blades at 50% span height (H) is comprised between 1.2 and 2.0.

3. The gas turbine engine according to claim 1, wherein the maximum leading edge radius of the first blades is greater than 0.4 mm.

4. The gas turbine engine according to claim 1, wherein the maximum leading edge radius of the first blades is less than 0.9 mm.

5. The gas turbine engine according to claim 1, wherein the ratio of the maximum leading edge radius of the first blades to a minimum leading edge radius of the first blades is less than 7.

6. The gas turbine engine according to claim 5, wherein the ratio of the maximum leading edge radius of the first blades to the minimum leading edge radius of the first blades is greater than 2.2.

7. The gas turbine engine according to claim 6, wherein the minimum leading edge radius of the first blades is comprised between 0.15 and 0.60 mm.

8. The gas turbine engine according to claim 1, wherein the ratio of a tip maximum thickness of the first blades to the maximum leading edge radius of the first blades is greater than 2 and less than 6.5.

9. The gas turbine engine according to claim 1, wherein upon activation the ESS heating system is adapted to provide the at least a portion of the external surface of each ESS vane with an amount of heat less than 5.0 W/m².

10. The gas turbine engine according to claim 9, wherein upon activation the ESS heating system is adapted to provide the at least a portion of the external surface of each ESS vane with an amount of heat greater than 0.2 W/m².

11. The gas turbine engine according to claim 1, wherein the at least a portion of the external surface of the ESS vanes is greater than 5% of the external surface of the ESS vanes.

12. The gas turbine engine according to claim 11, wherein the at least a portion of the external surface of the ESS vanes is less than 75% of the external surface of the ESS vanes.

13. The gas turbine engine according to claim 1, wherein the compressor is an intermediate pressure compressor, the gas turbine engine further comprising a high pressure compressor downstream of the intermediate pressure compressor; the turbine is an intermediate pressure turbine, the gas turbine engine further comprising a high pressure turbine upstream of the intermediate pressure turbine; and the shaft is a first shaft, the gas turbine engine further comprising a second shaft coupling the high pressure turbine to the high pressure compressor.

14. A method of ice protection for a gas turbine engine comprising:
  providing a gas turbine engine comprising:
    a fan mounted to rotate about a main longitudinal axis and generating a core airflow and a bypass airflow;
    a core duct, across which the core airflow flows;
    an engine core, comprising in axial flow series a compressor, a combustor, and a turbine coupled to the compressor through a shaft;
    an Engine Section Stator (ESS) comprising a plurality of ESS vanes arranged in the core duct downstream of the fan, each one of the plurality of ESS vanes comprising an external surface washed by the core airflow;
    an ESS heating system adapted to heat the ESS vanes;
    a temperature sensor adapted to detect the temperature of the external surface of at least one of the plurality of ESS vanes and send a signal to the ESS heating system when said temperature is below a reference temperature,
    a reduction gearbox that receives an input from the shaft and drives the fan at a lower rotational speed than the shaft,
    wherein the compressor comprises a first stage at an inlet comprising a first rotor with a row of first blades extending chordwise from a leading edge to a trailing edge, and spanwise from a root to a tip for a span height (H), wherein 0% of the span height (H) corresponds to the root and 100% of the span height (H) corresponds to the tip, and
    wherein the ratio of a maximum leading edge radius of the first blades to a leading edge radius of the first blades at 50% span height H is comprised between 1.0 and 2.2; and
  upon detection and/or inference of ice crystal conditions and receiving from the temperature sensor the signal that the temperature is below the reference temperature, activating the ESS heating system to heat at least a portion of the external surface of the ESS vanes and promote melting and adhering of ice crystals on said at least a portion of the external surface of the ESS vanes.

15. The method according to claim 14, wherein activating the ESS heating system comprises heating a portion of the external surface of each ESS vane greater than 5% of the external surface.

16. The method according to claim 14, wherein activating the ESS heating system comprises heating a portion of the external surface of each ESS vane less than 75% of the external surface.

17. The method according to claim 14, wherein activating the ESS heating system comprises providing the portion of the external surface of the ESS vanes an amount of heat less than 5.0 W/m$^2$.

18. The method according to claim 14, wherein activating the ESS heating system comprises providing the portion of the external surface of the ESS vanes an amount of heat greater than 0.2 W/m$^2$.

19. The method according to claim 15, wherein activating the ESS heating system comprises heating the external surface of the ESS vanes to a temperature of at least 0° C.

20. The method according to claim 19, wherein activating the ESS heating system comprises heating the external surface of the ESS vanes to a temperature of less than 40° C.

* * * * *